United States Patent [19]

Das et al.

[11] Patent Number: 5,043,214

[45] Date of Patent: * Aug. 27, 1991

[54] FLAME RESISTANT ARTICLE MADE OF PHENOLIC TRIAZINE AND RELATED METHOD

[75] Inventors: Sajal Das, Parsippany; Dusan C. Prevorsek; Raj Sharma, both of Morristown; Bruce DeBona, Randolph, all of N.J.

[73] Assignee: Allied-Signal Inc., Morris Township, Morris County, N.J.

[*] Notice: The portion of the term of this patent subsequent to May 16, 2006 has been disclaimed.

[21] Appl. No.: 484,337

[22] Filed: Feb. 26, 1990

Related U.S. Application Data

[62] Division of Ser. No. 232,407, Aug. 15, 1988, Pat. No. 4,988,780.

[51] Int. Cl.$^5$ .......................... D02G 3/00; C08G 8/28
[52] U.S. Cl. ................................. 428/359; 428/364; 428/920; 428/921; 428/457; 525/480; 525/504; 528/211
[58] Field of Search ................ 525/504, 480; 528/211; 428/920, 921, 359, 364, 457

[56] References Cited

U.S. PATENT DOCUMENTS

| | | | |
|---|---|---|---|
| 3,448,079 | 6/1969 | Grigat et al. | 525/504 |
| 4,022,755 | 5/1977 | Tanigaichi et al. | 525/504 |
| 4,831,086 | 5/1989 | Das et al. | 528/142 |
| 4,851,279 | 7/1989 | Das et al. | 525/504 |
| 4,970,276 | 11/1990 | Das | 525/504 |

*Primary Examiner*—Edith Buffalow
*Attorney, Agent, or Firm*—Richard C. Stewart; Gerhard H. Fuchs

[57] ABSTRACT

The present invention is flame resistant article and related method, made of phenolic triazine resin derived from a cyanato group containing phenolic resin of the formula:

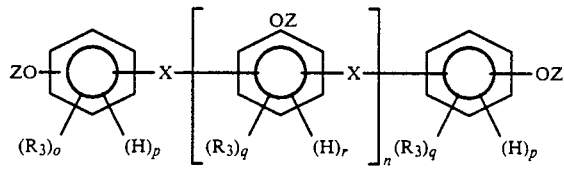

wherein:
- n is a positive whole number greater than or equal to 1;
- q and r are the same or different at each occurrence and are whole numbers from 0 to 3, with the proviso that the sum of q and r at each occurrence is equal to 3;
- Z is —CN, or hydrogen and —CN;
- o and p are the same or different at each occurrence and are whole numbers from 0 to 4 with the proviso that the sum of o and p at each occurrence is equal to 4;
- —X— is a divalent organic radical; and
- $R_3$ is the same or different at each occurrence and is a substituent other than hydrogen which is unreactive under conditions necessary to completely cure the copolymer.

49 Claims, 1 Drawing Sheet

FLAME RESISTANT ARTICLE MADE OF PHENOLIC TRIAZINE AND RELATED METHOD

This application is a division of application Ser. No. 232,407, filed Aug. 15, 1988, now U.S. Pat. No. 4,988,780.

The present invention is in the field of phenol based resins. More particularly, the present invention relates to a cyanato group containing phenolic resin, also known as phenolic cyanate resin, a method to prepare the resin, phenolic triazine resins derived therefrom, and articles made from the resin.

Cyanato group containing phenolic resins have been described in U.S. Pat. Nos. 3,448,079 and 4,022,755 as well as in Delano, et al., *Synthesis of Improved Phenolic Resins*, Acurex Corp/Aerotherm, Acurex Vinyl Report 79-25/AS, Sept. 4, 1979 prepared for NASA Lewis Research Center, Contract No. Nas3-21368, and is available through the United States Department of Commerce National Technical Information Service.

A recent reference, Heat Resistance Polymers by Critchley, et al, pp. 406–408 Plenum Press, New York, 1986 has described phenolic triazine resins prepared from phenolic novolac or meta-cresol novolac which have essentially the same chemical structures as described in the above referenced patents.

The phenolic triazines which have been disclosed have been found to have high thermal stability. Copending U.S. Ser. No. 041,018 filed as PCT/U.S. Ser. No. 87/00123, and U.S. Ser. No. 104,700 filed Oct. 5, 1987 now U.S. Pat. No. 4,831,086, hereby incorporated by reference disclose phenolic cyanate and phenolic triazine resins. The phenolic cyanate resins are disclosed to be stable as measured by gel time. The phenolic triazine resins are disclosed to be thermally stable as measured by Thermal Gravimetric Analysis.

Novolac resins are highly flame resistant, but are not high temperature resins. The temperature stability of novolac resins is limited because of oxidative decomposition of methylene bridge leading to punking (afterglow) upon expositure to a flame.

Decomposition of the peroxide formed at the methylene linkage is an exothermic reaction and leading to significant loss of weight and strength as temperatures approach 200° C.

SUMMARY OF THE INVENTION

The present invention is a flame resistant composition, article of manufacture and a related method to manufacture the article. The composite comprises a phenolic cyanate resin and/or a phenolic triazine resin which has flame resistant properties as indicated by a Limiting Oxygen Index (LOI) of greater than 35 and preferably greater than 40 when calculated using the formula OI=15.5+0.4 (% char) where char yield is measured at 800° C. by Thermogravimetric Analysis (TGA) in argon by heating a sample with temperature increasing at 10° C./min. The char yield is the weight percent of sample remaining at 800° C. The composition has improved, flame resistant properties such as resistance to punking, resistance to flame spread as measured by the procedure setforth below, and reduced smoke generation upon exposure to a flame.

The article of manufacture is made of a composition comprising a phenolic cyanate resin or phenolic triazine resin. Both triazine and cyanate ester formation deactivate the benzene nucleus of the phenolic resin and thus inhibits peroxide formation at the methylene linkage, through both steric and inductive effects. Thermal and oxidative stability is enhanced and the possibility of afterglow or punking is diminished. In addition to thermal and oxidative stability, the mechanical properties of phenolic triazine resin are substantially improved through the contribution of the ether and triazine bridge.

The phenolic cyanate resin useful in the composition and article of the present invention is derived from a cyanato group containing phenolic resin of Formula I:

FORMULA I wherein:
n is a positive whole number greater than or equal to 1, preferably 4 to 20, and more preferably 4 to 10;
q and r are the same or different at each occurrence and are whole numbers from 0 to 3, with the proviso that the sum of q and r at each occurrence is equal to 3, preferably of q is equal to 0 and r is equal to 3;
Z is —CN, or hydrogen and —CN;
o and p are the same or different at each occurrence and are whole numbers from 0 to 4 with the proviso that the sum of o and p at each occurrence is equal to 4, preferably o is equal to 0 and p is equal to 4;
—X— is a divalent organic radical; and
$R_3$ is the same or different at each occurrence and is a substituent other than hydrogen which is unreactive under conditions necessary to completely cure the copolymer.

There is from 5 to 100, preferably 10 to 100, more preferably 50 to 100, most preferably 70 to 100 and yet more preferably 80 to 100 mole % —OCN groups based upon the sum of the moles of the —OCN and —OH groups.

X is preferably a radical selected from the group consisting of: —$CH_2$—, —CO—; —$SO_2$—, with —$CH_2$— preferred. y is a positive number greater or equal to 1 and preferably 1. R is preferably selected from hydrogen and methyl groups.

The cyanato group containing phenolic resin can be incompletely (partially) crosslinked or fully crosslinked to form the phenolic triazine resin of the present invention. The phenolic triazine can be formed by heating the cyanato group containing phenolic resin. The cyanato group containing phenolic resin is stable and has a long shelf life. This is indicated by the gel time of greater than 1 minute, preferably greater than 2 minutes, more preferably greater than 10 minutes at 155° C., and most preferably greater than 20 minutes at 155° C. The cyanato group containing phenolic resin cures to form a phenolic triazine which can be characterized as having a thermal stability indicated by thermal decomposition temperature of at least 400° C. and preferably of at least 450° C. as measured by Thermal Gravimetric Analysis (TGA).

The cyanato group containing phenolic resin useful to make the article of the present invention preferably has a number average molecular weight of from about 300 to 2000, preferably 320 to about 1500, more preferably about 500 to 1500 and most preferably about 600 to 1300.

The present invention includes an article made of a phenolic triazine resin derived from the cyanato group containing phenolic resin described above. A specific article is a composite panel. This comprises at least one layer of fiber reinforcement in a matrix of phenolic cyanate resin or phenolic triazine resin.

The phenolic cyanate resin can be formed into the article. Alternately, it can be partially crosslinked or fully crosslinked to phenolic triazine resin and made into the article. The article made of the phenolic cyanate resin or partially crosslinked phenolic cyanate resin can be reacted, typically by heating to form the triazine resin article.

DESCRIPTION OF THE PREFERRED EMBODIMENTS

The present invention is a flame resistant composition, article of manufacture, and method of making the article.

The article comprises a composition comprising a phenolic cyanate resin or a phenolic triazine resin derived from a cyanate resin. The composition has a Limiting Oxygen Index (LOI) of greater than 35, and preferably greater than 40 when calculated using the Formula OI=17.5+0.4 (% char) where OI is oxygen index, and char yield (% char) is measured at 800° C. by TGA in argon. The LOI can also be measured by ASTM D-2863. The composition has proved flame resistant properties such as resistance to punkinq, resistance to flame spread as measured by the procedure setforth below, and reduced smoke generation as measured by ASTM-E-662 upon exposure to a flame.

The phenolic cyanate resin useful in the present invention has Formula I where X is preferably a radical selected from the group consisting of: —CH$_2$—, —CO—; —SO$_2$—, with —CH$_2$— preferred is greater or equal to 1. R is preferably selected from hydrogen methyl groups. The phenolic cyanate resin has improved gel time and long shelf life. The gel time as measured by the Hot Plate Stroke Cure Method (see Examples) of greater than 1 minute, preferably 2 minutes, more preferably greater than 10 minutes, and most preferably greater than 20 minutes at 155° C. The phenolic triazine resin has low volatiles, and excellent char yield and thermal properties.

An alternate way of measuring the stability of the cyanato group containing resin useful in the present invention is whether the resin is capable of forming a phenolic triazine resin having the thermal decomposition temperature of at least 400° C. and preferably of at least 450° C. as measured by Thermal Gravimetric Analysis (TGA). The phenolic triazine resin of the present invention has a char value at 800° C. of at least 50% by weight, preferably from 50 to 70% by weight, and more preferably 60 to 70% by weight.

It is believed that the improved properties of the resin of the phenolic cyanate resin used in the present invention are attributed to the resin having a residual amount of a dialkyl cyanamide, typically diethyl cyanamide of less than 2% by weight, preferably less than 1% by weight and most preferably substantially none. The diethyl cyanamide is undesirable because it generates smoke upon curing.

Preferably the cyanato group containing phenolic resin has a residual amount of phenyl cyanate of less than 2% by weight and preferably less than 1% by weight and most preferably less than 0.5% by weight. This is desirable since it has been found that the phenol cyanate is a volatile material that contributes to thermal instability and the formation of smoke during curing of the resin. In addition phenol cyanate acts as a chain inhibitor for cyclotrimerization reaction.

The phenolic cyanate resin of the present invention is satisfactory and results in satisfactory cured triazine materials regardless of molecular weight. The preferred molecular weight range of the phenolic cyanate resin is a number average molecular weight of 300 to 2000, preferably 320 to about 1500, more preferably about 500 to 1000 and most preferably from about 600 to 1300. The molecular weight distribution and number average molecular weight of the cyanato group containing phenolic resin can be determined by gel permeation chromatography(GPC) using tetrahydrofuran as a solvent.

The phenolic cyanate resins forms a phenolic triazine network upon heating and/or in the presence of a curing agent. Typical curing conditions are from 150° to 250° C. at 100 to 500 psi pressure for 0.1 to 1 hour depending on sample size, or by autoclave at low pressures including pressures below 100 psi. The high density of cross linkage of the cured products results in excellent characteristics including thermal properties and a glass transition temperature of 300° C. or higher.

The phenolic triazine resin useful to make articles of the present invention is formed by the curing of the cyanato group containing phenolic resin. The curing reaction is known as "cyclotrimerization". As used herein, "completely cured" phenolic triazine resin includes those in which the glass transition temperature of the cured resin is greater than 300° C., measured by DMA, dynamic mechanical analysis.

A preferred phenolic triazine resin begins with a phenolic novolac backbone. This is reacted with cyanogen halide such as cyanogen bromide (CNBr) in presence of an organic base, such as triethylamine (Et$_3$N) in a solvent such as tetrahydrofuran (THF) to form phenolic cyanate m and n are integers, typically there are 80 to 100 percent of n units and 20 to 10 percent m units. Under the influence of heat and/or a suitable catalyst phenolic-cyanate forms phenolic cyanate-phenolic triazine precursor.

The phenolic cyanate-phenolic triazine precursor resin can be used to form phenolic-triazine resin.

The phenolic cyanate resin of the present invention can be derived from a phenolic novolac. Useful phenolic novolac resins are known in the art. A typical and useful one is disclosed in U.S. Pat. No. 4,022,755 at column 2 beginning at line 27. Particularly useful phenols include phenol, cresol and xylenol.

The present invention relates to flame retardant resins which are self-extinguishing and do not generate smoke upon exposure to flame. The invention also includes a novel process for producing phenolic-triazine resin having the aforesaid characteristics.

The present invention includes a method to make articles having an LOI of greater than 35, preferably from 35 to 50, and more preferably from 40 to 45, measured char yield at 800° C. by TGA. The method comprises making an article from the phenolic triazine derived from the cyanato group containing phenolic resin recited above. This comprises the steps of reacting novolac resin and a trialkyl amine in a suitable organic solvent, preferably a cyclic ether solvent to form the trialkylammonnium salt, followed by reacting this trialkylammonium salt with cyanogen halide in the cyclic ether to form the cyanato group containing phenolic resin. The method is conducted at a temperature range of below −5° C., preferably from −5° C. to −65° C., more preferably from −5° C. to −30° C. and most preferably from −10° C. to −30° C.

The reaction product is in solution in the cyclic ether. This reaction product is a cyanato group containing phenolic resin. It is separated from the solution by a suitable separation technique. The preferred technique is precipitation into a nonsolvent vehicle. Useful nonsolvents are alcohols with isopropanol being preferred. The separation is preferably conducted at atmospheric pressure. While it can be conducted at room temperature, the temperature is typically from −0° C. to −45° C., preferably −5° C. to −25° C. Precipitation is preferably conducted with agitation.

The formation of the phenolic cyanate resin used in the article of the present invention is followed by forming this resin into an article. The article can be made of the phenolic cyanate resin and can be cured by the application of heat or by the use of a suitable catalyst or a combination of both. The phenolic cyanate resin can be cured into a phenolic triazine resin in a suitable form and the cured structure shaped by appropriate means such as cutting into the suitable configuration for an article. Alternatively the resin can be incompletely cured followed by forming into an article. The article formed of the incompletely cured resin can be used as is or further curing the article can be conducted.

The improved properties of the resin used in the present invention are due to reacting the phenolic cyanate resin and a trialkyl amine in a cyclic ether solvent to form the trialkylammonium salt of novolac resin this is followed by reacting the trialkylammonium salt with a cyanogen halide in the cyclic ether to form the phenolic cyanate resin. The reaction is conducted at below about −5° C., preferably to −5° C. to −65° C., more preferably from −10° C. to −30° C. and most preferably from −15° C. to −30° C.

The cyclic ether solvent has been found to be an important reaction medium to form the phenolic cyanate resin of the present invention. The cyclic ether solvent is preferably selected from the group consisting of: tetrahydrofuran; 1,4 dioxan; and furan. The trialkyl amine can be selected from triethyl amine, tripropylamine and triethylcyclohexyl amine. Additionally, the reaction medium can contain other bases to control the pH to help control the rate of the reaction.

The relative amounts of solvent i.e. tetrahydrofuran, trialkylamine, and phenolic resin used should be controlled to control gel time of the cyanato group containing phenolic resin. Concentrations can be measured as a function of the weight percent of the trialkyammonium salt which could theoretically be calculated based on the weight of the trialkylamine, phenolic resin and solvent. Preferably, the amount of trialkylammonium salt is from 5 to 35, more preferably 10 to 25, and most preferably from 10 to 20 percent by weight. The preferred concentration can vary depending on the specific solvents and reactants used.

The articles made of the cured cyanato group containing phenol resin have a wide range of applications such as manufacture of surface coating materials, cast plastics, adhesives, laminates, and molding materials. The resin may be used as is or in combination with other cyanic esters, other polymers, fillers or reinforcing materials, or catalysts.

Preferred articles of the present invention comprise the resin of the present invention and fiber. The articles can be made of compositions comprising short fiber up to ½ inch long and preferably from 1/16 to ¼ of an inch long, and long fibers greater than ½ inch long. More preferred are articles made using long fibers coated with resin or impregnated into resin layers. Continuous fibers can be resin coated and pultruded to make pultruded articles such as sucker rods and other types or rods. The fiber can be coated or embedded in phenolic cyanate resin to form single layers which are called prepreg layers. The prepreg layers can be made of the fiber impregnated or coated with polycyanate resin. The prepreg layers can be cured to make a phenolic triazine resin composite article. Alternately the prepreg layers can be cured to form phenolic triazine layers which can be used in one or more layers to make panels and sheets.

When short fibers are used the composition comprises from 5 to 150 and preferably 25 to 75 weight % of the short fibers. When long fibers are used the composition comprises from 5 to 150 and preferably from 25 to 75% by weight of the long fibers. The composite articles of the present invention may be arranged in networks having various configurations. A plurality of fibers can be grouped together to form a twisted or untwisted yarn. The fibers for yarn may be formed as a felt, knitted or woven (plain, basket, satin and crow feet weaves, etc.) into a network fabricated into nonwoven fabric articles in parallel array, layered or formed into a fabric by any of a variety of conventional techniques.

The fibers may be pre-coated with the phenolic cyanate resin or partially cured phenolic cyanate resin of the present invention. The coated fibers can be pultruded, filament wound, or formed into layers.

The proportion of the coating on the coated fibers or fabrics may vary from relatively small, (e.g. 1% by weight of the fibers) to relatively large amounts ( e.g. 150% by weight of fibers). The fiber to resin ratio depends on the application to be used. Properties to be considered include impact resistance, heat resistant, wear resistance, flammability resistance. Preferably the resin impregnated articles of the present invention contain coated fibers having 25 to 75, preferably 55 to 65, and more preferably 58 to 62 weight % fiber.

The coating may be applied to the fiber in a variety of ways. One method is to apply the resin of the coating material to the fibers either as a liquid, a sticky solid or particles in suspension, or in a fluidized bed. Alternately, the coating may be applied as a solution in a suitable solvent which does not adversely affect the properties of the fiber at the temperature of the application. While any liquid capable of dissolving or dispersing the resin of the present invention can be used, preferred groups of solvents include acetone, methyl ethyl ketone, methylene chloride and methyl isobutyl ketone (MIBK). The techniques used to dissolve or disperse the coating resin in solvents will be those conventionally used for coating of similar resin materials on a variety of substrates.

The proportion of resin to fiber is variable can be from 5 to 150% by weight of fiber. Within this range it is preferred to use composites having a relatively high fiber content, such composites preferably have 10 to 50% matrix material by weight and more preferably 10 to 42% matrix material by weight. Stated another way, the fiber network occupies different proportion to the total volume of the composite. Preferably, however, the fiber network comprises at least 30% by volume of the composite.

A useful technique for preparing preferred prepregs of the present invention comprised of substantially parallel, unidirectionally aligned fibers includes the steps of pulling fiber through a bath containing a solution of the resin, and helically winding the fiber into a single sheet-like layer around and along the length of a suitable form, such as a cylinder. The solvent is then evaporated leaving a prepreg sheet of fiber embedded in a phenolic cyanate matrix that can be removed from the cylinder after proper curing. Alternately, a plurality of fibers can be simultaneously pulled through the bath of the resin solution and laid down in closely positioned, in substantially parallel relation to one another on a suitable surface. Evaporation of the solvent leaves a prepreg sheet comprised of the resin coated fibers which are substantially parallel and aligned along a common fiber direction. The sheet is subsequently processed such as by laminating one sheet to another.

Similarly, yarn-type composite can be produced by pulling a group of filaments through the solution of the phenolic cyanate resin to substantially coat each of the individual filaments, and then evaporating the solvent to form coated yarn. The yarn can then for example be employed to form fabrics, which in turn can be used to form composite structures. The yarn can also be processed into composites by employing conventional filament windinq techniques. For example the composite can have coated yarn formed wound into overlapping fiber layers. Fabrics can also be coated with the phenolic cyanate resin of the present invention. Such fabrics can include woven fabrics as described above as well as non-woven mats.

The fiber used in the prepreg layer can be any fibrous network woven or non-woven. Useful fibers include fiberglass, asbestos, carbon, graphite, boron, cellulose, titrates, polymers such as polyesters, polyamices, polyaramides, polyacrylics, ultra high molecular weight polyolefins including polyethylene and polyvinyl alcohol, metallics, amorphous metals such as those sold under the tradename Metglas ® by Allied-Signal, Inc. and mixtures thereof.

The article of the present invention can be laminated with a polymeric and/or metal films adjacent to the outer surfaces of the phenolic cyanate resin prepreg or phenolic triazine layer. It is preferable to use a flame resistant outer layer to compliment the flame resistant properties of the phenolic cyanate resin prepreg and composite layers.

A particularly preferred article made using the above described resin is a prepreg. A prepreg is a fibrous layer impregnated with the phenolic cyanate resin of the present invention. The prepreg itself can be used as a single layer which can be crosslinked to form a polytriazine impregnated fibrous layer. Alternately, a composite can be made of at least two adjacent layers connected through resin of each layer. The composite can be used prior to curing where the resin is a phenolic cyanate resin or after curing where the resin is crosslinked to form a phenolic triazine type resin.

Figures 1, 2:
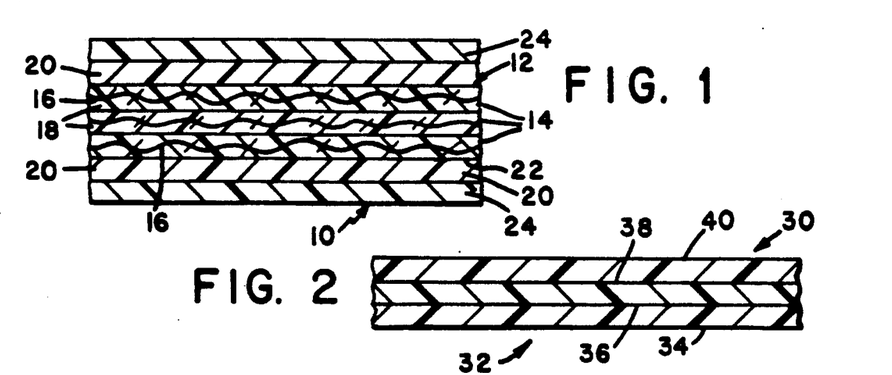
FIG. 1 is a schematic side view of a composite of the present invention.
FIG. 2 is schematic drawing of a laminate comprising a printed layer.

A preferred embodiment of the present invention is 10, illustrated in FIG. 1. The a composite 12 comprises three prepreg layers 14. Each prepreg layer comprises a fibrous layer. The fibrous layer comprises a fibrous network 16 embedded in a phenolic cyanate resin 18 of the present invention. A preferred fibrous network is woven fiberglass. The phenolic cyanate resin may be cured to form a phenolic triazine. The composite 12 can have a polymeric layer 20 adjacent to one or both of its outer surfaces 20. A preferred polymeric layer 20 is polyvinylidine fluoride. This polymer is flame resistant and can be printed upon. The layer can be printed upon and then a further additional protective layer 24 of a suitable polymer such as polyvinylidene fluoride can be finally applied. The polymeric layer 22 and the protective layer 24 can be applied by suitable means known in the art. Optionally, and where heat and pressure are insufficient to provide suitable adhesion to the panel 12 adhesives can be used between at the outer surface 22.

Figure 3:
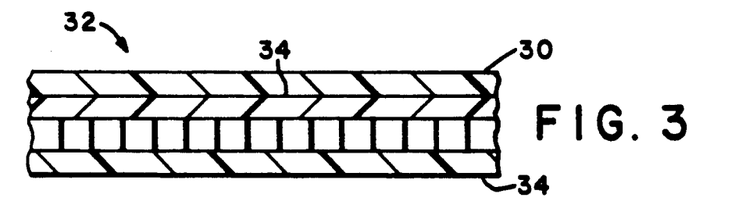
FIG. 3 is a composite panel comprising a honeycomb layer and the laminate of FIG. 2.

FIGS. 2 and 3 are directed to a laminate 30 useful to make a panel 32. The laminate 30 is made of a prepreg layer 34 which is made of a square woven fiberglass fabric impregnated with a polycyanate resin. The prepreg layer 34 is laminated adjacent to a polymeric layer 36 such as white polyvinylidine fluoride. There can be a print layer 38 which can be word and/or design. Finally, there can be a protective polymeric layer 40 which is transparent and permits the designs and/or print to be clearly viewed through it.

FIG. 3 illustrates a panel made using the laminate of FIG. 2. The panel 32 comprises a Nomex ® core made by Hexcell Corp. The Nomex core is a hexagonal honeycomb core made of aromatic polyamide. The core is one ⅜ inch high, with hexagonal cells with the hexagon has ⅛ inch long sides. The core has a density of about 3 pounds per cubic foot.

Several examples are set forth below to illustrate the nature of the invention and method of carrying it out. However, the invention should not be considered as being limited to the details thereof. All parts are by weight unless otherwise indicated.

EXAMPLE 1

Preparation of the Phenolic Cyanate Resin

A mixture of 204 g of novolac (672 number average molecular weight) and 212 g triethylamine was dissolved in one liter of tetrahydrofuran at ambient temperature to form a triethyl ammonium salt of novolac. A 240 g sample of cyanogen bromide was dissolved in one liter of tetrahydrofuran under nitrogen atmosphere. The solution containing the triethylammonium salt of novolac was added to cyanogen bromide solution with a average addition rate 7–8 ml/min. During the addition, the temperature of the reaction mixture was maintained at $-20$ to $-30°$ C. After the reaction was completed, the reaction mixture was stirred for additional one hour and the temperature of reaction mixture rose to $+10°$ C. The product was isolated by filtration to remove triethylammonium hydrobromide salt. The filtrate was purified by precipitation in a cold isopropanol/dry ice mixture ($-15°$ C. to $-20°$ C.) (twice), and subsequently dried in a vacuum overnight to produce an off white phenolic cyanate resin. Elemental analysis indicated: C=72.25 wt %, H=4.0 wt %, and N=10.22 wt %. The IR Spectrum indicated absorption at $-C \equiv N$ (2230 cm$^{-1}$) and absence of any carbamate. Gas chromatograph analysis showed absence of diethyl cyanamide. GPC (gel permeation chromotograph) resulted in a number average molecular weight of 1352 for cyanated novolac resin.

The char residue at 800° C. was measured for the phenolic cyanate resin of this Example. The char residue was measured by thermogravimetric analysis (TGA). A 35 mg sample was heated at a rate of 10° C./min. The char residue is the measurement of the amount (percent by weight) of sample left at 800° C.

The Limiting Oxygen Index (LOI) is sometimes used as a measure of flammability resistance in polymers. In general, high char forming polymers yield high LOI values. The LOI can be empirically calculated from the equation: $OI = 17.5 + 0.4$ (% char yield) where OI is oxygen index. Char yield is measured by Thermogravimetric Analysis (TGA) at 800° C.

The char yield for the sample of Example 1 was 68.5% at 800° C. This resulted in an LOI of 45. For comparison purposes the LOI has been reported for resorcinol phenolic resins to be about 32 using ASTM D-2863.

Figure 4:
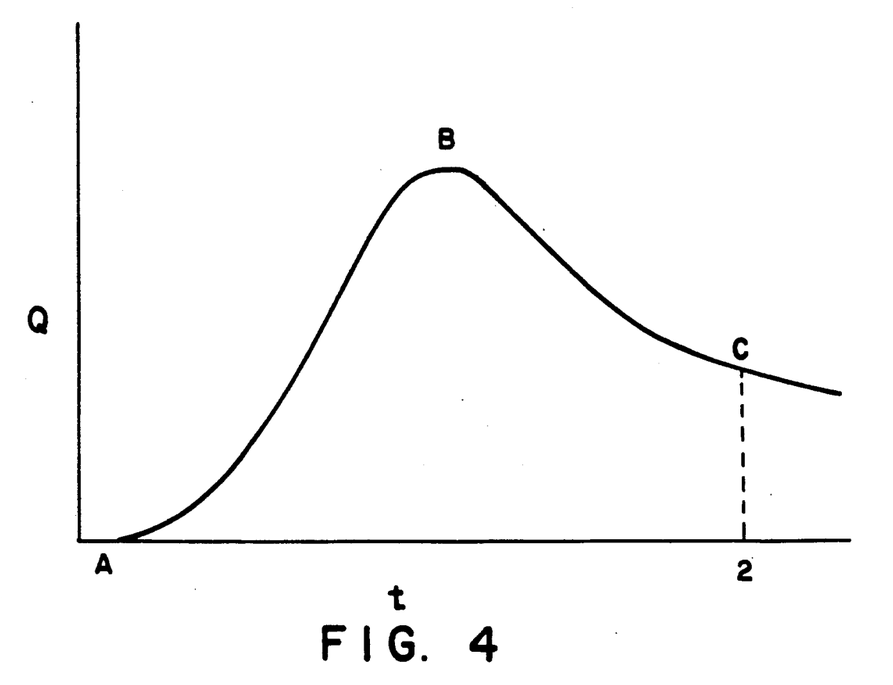
FIG. 4 is a schematic graph of heat generation (Q) versus time (t).

The flammability resistance for the resin was also measured according to the Ohio State University heat release test (OSU test). This test measures the amount of heat evolved in a period of 2 minutes (C) as well as the rate of heat evolution at the peak (B) when a given test sample is exposed to radiation under specified conditions. OSU test results in a curve of heat evolution versus time. FIG. 4 shows a typical curve. At 0 time (A) no heat is evolved. The rate of heat is increased at specified conditions according to the Federal Aviation Administration (FAA). This corresponds to the impinqement of a sample at rate of 3.5 watts/cm². The volatiles are completely burnt by a small flame and the heat evolved is recorded as a function of time. The measurements were carried out at the Chemical Engineering Department of Ohio State University. The heat evolution characteristics of phenolic triazine resin relative to standard phenolic resin were determined using the procedures described below. Glass fabric does not contribute to heat evolution. Lower B and C values which indicate less heat generation upon burning are desireable.

A number of panels using glass fabric and resin were prepared from the respective prepregs. The glass was obtained from Clark's Schwebel Fiberglas Corp. as type 7781 fabric code ECDE 75410. It is made of E glass, 7500 yards/pound, single strand yarn. The fabric was satin weave and weighs 9 ounces/yd² and had a volan finish.

A predetermined size of glass fabric was uniformly coated with a 60 wt % solution of resin in methyl ethyl ketone (MEK) so that a known amount of resin was incorporated into a known weight of the fabric. The glass fabric weighed 7.1 grams per 6 inch by 6 inch square of fabric. These prepregs were dried at room temperature. Three 6 inch by 6 inch dry prepregs were stacked upon one another and cured in a hot press. Curing was carried out by heating the platen to 150° C., keeping the mold at this temperature for one half hour Chemical Div. as UP520. This material has Formula I where Z—H, and $R_3$=H. Comparative 2 was PPF an Example was a cyanated PPF (CPPF)

TABLE 1

| | Wt of Resin (g) | Resin Type | B Peak Rate kw/m² (at secs) | C 2 min Heat kw min/m² | B Peak Rate/g kw/m² | C 2 min Heat Release/g kw min/m² |
|---|---|---|---|---|---|---|
| | | | OSU TEST RESULTS | | | |
| Ex. 1a | 4.2 | PT | 16.2 (37) | 10.5 | 3.9 | 2.5 |
| Ex. 1b | 4.1 | PT | 19.7 (31) | 11.1 | 4.8 | 2.7 |
| Ex. 1c | 3.8 | PT | 10.9 (34) | 8.5 | 2.9 | 2.2 |
| Ex. 1d | 4.8 | PT | 20.6 (31) | 11.9 | 4.3 | 2.5 |
| | | | | Avg | 4.0 | 2.5 |
| Ex. 1e | 5.1 | PC | 29.3 (29) | 12.6 | 5.7 | 2.5 |
| Ex. 1f | 4.9 | PC | 23.1 (26) | 14.6 | 6.6 | 3.0 |
| | | | | Avg | 6.2 | 2.8 |
| Ex. 1g | 5.6 | PC | 38.5 (27) | 16.5 | 6.9 | 2.9 |
| | | | | | 6.9 | 2.9 |
| Comp. 1a | 3.1 | PF | 31.5 (28) | 31.9 | 10.2 | 10.3 |
| Comp. 1b | 3.1 | PF | 47.9 (29) | 29.3 | 15.5 | 9.5 |
| Ex. 2a | 5.9 | CPFF | 55.4 (25) | 21.0 | 9.4 | 3.6 |
| Ex. 2b | 5.9 | CPFF | 56.7 (24) | 18.6 | 9.6 | 3.2 |
| Ex. 2c | 6.2 | CPFF | 54.7 (24) | 17.9 | 8.8 | 2.9 |
| | | | | Avg | 9.3 | 3.2 |
| Comp. 2a | 3.6 | PFF | 60.4 (21) | 33.8 | 16.8 | 9.4 |
| Comp. 2b | 3.8 | PFF | 58.7 (20) | 29.9 | 15.4 | 7.9 |
| Comp. 2c | 4.0 | PFF | 58.0 (20) | 30.1 | 14.5 | 7.5 |
| | | | | Avg | 15.6 | 8.3 | and under 1000 psi pressure and then cooling the press to room temperature. The cured laminates were cleaned of any resin that might have squeezed out at the edges during curing. The cleaned laminates were weighed and the resin content determined from the weight of uncoated glass fabric weight in the laminate.

Examples 1a, 1b, 1c, and 1d were phenolic triazine (PT) resin as described above. Example 1e and 1f were conducted on phenolic cyanate (PC) laminates precured for 20 minutes at 120° C. Ex 1 g was conducted on a phenolic cyanate laminates precured for 10 minutes. Comparatives 1a and 1b were laminates made using phenol formaldehyde resin. Comparatives 2a, 2b, and 2c were made using phenol furfuraldehyde (PPF). Examples 2a and 2b were made using cyanated PFF (CPPF).

The OSU test was carried out on each sample in triplicate. The average of three values is shown in Table 1. Results are presented as points B and C for a FIG. 4 type curve for the laminates as a whole, and per gram of resin. In addition to measuring the heat evolution, the equipment used at OSU also had the capability of detecting any smoke generation during the test. The results show that the two minute heat release per gram of resin as well as the peak release rate are both significantly lower for phenolic triazine resin compared to phenolic novolac resin made using 9% by weight hexamethylene tetraamine. The burning of the phenolic triazine resin did not generate any smoke. This is in contrast to the phenolic resin which generated smoke.

In Example 2 and Comparative 2 phenol furfuraldehyde (PPF) was obtained Quaker and Oats Company,

EXAMPLE 3

The method of Example 1 was repeated except that the novolac used had a 980 number average molecular weight. The triethylammonium salt of novolac was added to the cyanogen bromide solution over a period of three hours with an average addition rate of 7-8 ml/min. The reaction mixture was maintained at −30° C. Otherwise the conditions of Example 3 were identical to that of Example 1. The number average molecular weight from GPC analysis was found to be 1530. This resin can be used to make the article of the present invention.

EXAMPLE 4

Example 1 was again repeated except that a mixture of 50 grams of novolac (672 number average molecular weight) and 51.0 grams of triethylamine was dissolved in 160 grams of tetrahydrofuran at ambient temperature to form the triethyl ammonium salt. 57.7 grams of cyanogen bromide was dissolved in 135 grams of tetrahydrofuran under nitrogen atmosphere. The solution containing the triethylammonium salt of novolac was added to cyanogen bromide solution over a period of one hour. During the addition the temperature of the reaction mixture was maintained at from −10° to −15° C. The procedure of Example 1 was then followed. This resin can be used to make the article of the present invention.

SAMPLE TESTING

Measurements were made to determine the gel time of the cyanato containing phenolic resins produced by Examples 1 through 3 of the present invention as well as the comparative examples. The samples were tested for gel time using the following procedure:

Apparatus

Stop watch
0°-250° C. thermometer
Electric hot plate, adjusted to 155° to ±1° C. and enclosed in a wind shield
4" Spatula

Method

1. For powdered resin: Weigh out a 1.0 gram sample on a watch glass.
2. Quickly dump the complete sample on the center surface of the hot plate and at the same time start the stop watch.
3. Using a 4" spatula, spread the resin over a 2 inch square area in the center of the hot plate and stroke the entire area with the spatula to a rate approximating 80 strokes per minute. Without stopping the watch, note the time it took for the resin to melt.
4. Continue stroking, keeping the blade of the spatula close to the surface of the resin, until the resin has passed through a stringy stage and suddenly seems hard and glazed and offers little or no resistance to stroking with the spatula. This end point is best determined only after considerable practice to get the "feel" of the resin as it "lets go" at its gel point.
5. Record number of seconds to melt and number of seconds for gel time (cure time). Subsequent checks on the same sample should agree within ±5 seconds.

Smoke generation was a visual observation during the testing of gel time. The percent diethyl cyanamide was measured by Gel Permeation Chromatography (GC). Table 2.

TABLE 2

| Example | Gel Time (min) | Smoke | Diethyl Cyanamide wt % by GC |
| --- | --- | --- | --- |
| Example 1 | 20-30 | No | None |
| Example 3 | 8-10 | No | None |
| Example 4 | 2-3 | No | None |

EXAMPLE 5

160 g phenol (1.7 mole), 100 g (1.23 mole) of 37 percent formaldehyde, 1.1 g of oxalic acid dihydrate and 0.3 g of (35% by weight) of hydrochloric acid was added to a round bottom flask equipped with a mechanical stirrer, condenser and nitrogen inlet. The mixture was heated to 100° C. until an emulsion formed. Upon further heating the mixture, the emulsion changed to a clear solution. The mixture was heated to reflux for 80 minutes and then dehydrated under reduced pressure (20 min) until the distillate temperature rose to 65° C. The reaction product was phenolic novolac resin having a melting point of 60°-65° C. The GPC analysis showed the number average molecular weight (Mn) to be 410. The free phenol content was about 6.5%.

A mixture of 102 g of novolac, 106 g of triethylamine was dissolved in 350 ml methylene chloride at ambient temperature to form a triethylammonium salt of novolac. 120 g of cyanogen bromide was dissolved in 350 ml of methylene chloride. The solution containing the triethyl ammonium salt of novolac was added slowly to the solution of cyanogen bromide.

During the addition, the temperature of the reaction mixture was maintained at −40° C. to −30° C. After the addition of salt solution was completed the reaction mixture was stirred for additional 15 minutes and product was isolated by filtration to remove triethylammonium hydrobromide salt. The cyanato containing phenolic resin was purified by extraction with water. The methylene chloride was removed with a rotary evaporator at 50° C. under reduced pressure. The product was isolated as a viscous liquid. After drying the product in a vacuum oven at room temperature one night then and at 50° C. overnight, the product still remained as a viscous liquid. The solid content of the product was determined at 100° C. for ½hours, which was found to be 97%. The IR Spectra indicate C≡N group as well as traces of triazine group. The GPC analysis shows the number average molecular weight (Mn) 620 and; cyanated monomer was found about 1.26%. The TGA data shows 65% char at 900° C.

This resin can be used to make the article of the present invention.

EXAMPLE 6

Fabrication of Fiberglass PT resin composite

Fabric Type 7781 was selected for a fiberglass prepreg. The PT resin content in the prepregs is shown in Table 3. The prepregs were made by coating the fabric with a solution of PT resin methyl ethyl ketone followed by drying the prepregs by solvent removal.

Laminates were prepared by a compression molding technique using a specially designed molding fixture for "6"×6" test plaques with provision for variable thickness. The cure cycle used is described in Table 3. Flammability resistance was measured according to FAR part 25 Appendix F, Verticle Test Method (60 seconds) on the 6×6 plaques, The terms used to measure flammability are:

1. Extinguishing Time—The total time, in seconds, that the specimen flames after the removal of the ignition source.
2. Burn Length—The distance from the original specimen edge to the farthest point showing evidence of damage due to that area's combustion, including areas of partial consumption, charring, or embrittlement, but not including areas sooted, stained, warped, or discolored, nor areas where material has shrunk or melted away from the heat.
3. Drip Extinguishing Time—The time required in seconds for the burning drips to extinguish.

TABLE 3

| | Flammability Results of Glass Fabric/PT Composite | | | | | | |
| --- | --- | --- | --- | --- | --- | --- | --- |
| | | | | | 60 Sec. Vertical Test | | |
| Resin used | Resin wt % | Cure temp (°C.) Time (min) | Pressure PSI | Thickness (inches) | Self-Extinguish Time (sec) | Burn length (in) | Drip Extinguish Time (sec) |
| Ex. 4 | 35 | 125/30 | 1112 | .060 | 4 | 3.1 | No drip |
| Ex. 4 | 35 | 125/120 | 1112 | .060 | 0 | 2.5 | No drip |
| Ex. 4 | 34.9 | 125/240* | 1112 | .060 | 4 | 2.4 | No drip |

TABLE 3-continued

Flammability Results of Glass Fabric/PT Composite

| | | | | | 60 Sec. Vertical Test | | |
|---|---|---|---|---|---|---|---|
| Resin used | Resin wt % | Cure temp (°C.) Time (min) | Pressure PSI | Thickness (inches) | Self-Extinguish Time (sec) | Burn length (in) | Drip Extinguish Time (sec) |
| Ex. 4 | 30.1 | 125/30 | 1112 | .0095 | 0 | 3.1 | No drip |

*Postcured 1 hr. 150° C., 1 hr 200° C., 1 hr 250° C.

EXAMPLE 7

Carbon fiber reinforced composites were made using the resin of the present invention. The carbon fiber was woven carbon fiber cloth made by Amoco Performance Products and distributed by Fiberite Corp. The fabric was W5-322 made from T 300 carbon fiber made from polyacrylonitrile. The fabric was plain weave and had UC 309 sizing. The fiber had no twist an elongation of 1.5% fiber density 1.74 gr/cc, tensile strength $52 \times 10^3$ psi and a modulus of $34.3 \times 10^6$ psi. The resin was the resin from Example 1. In Example 7a the prepreg laminate had 10 plies with a thickness of 0.066 to 0.071 inches. In Example 7b the prepreg laminate had 9 plies with a thickness of 0.095 to 0.67 inches. The fiber volume was 65%. The cloth was impregnated with a solution of resin in MEK. The impregnated cloth was cured for 1 hour at 280° C., at 250 psi.

The composites were tested for flame resistance according to FAR Part 25 and specific optical density of smoke generated by solid materials according to ASTM E 662. Results are summarized on Tables 4-6 below:

TABLE 4

TEST RESULTS
60 Second Vertical Burn Test

| Sample | Specimen Number | Self-Extinguish Time | Burn Length | Drip/Burn |
|---|---|---|---|---|
| Ex. 7a | 1 | 0 seconds | 0 inches | No drip |
| | 2 | 0 seconds | 0 inches | No drip |
| Ex. 7b | 1 | 0 seconds | 0 inches | No drip |
| | 2 | 0 seconds | 0 inches | No drip |

TABLE 5

Specific Optical Density - Ex. 7a

| | Smoldering | | Flaming | |
|---|---|---|---|---|
| Properties | Individual Values | Average Value | Individual Values | Average Value |
| Ds @ 1.5 minutes | 0, 0 | 0 | 0, 0 | 0 |
| Ds @ 4.0 minutes | 0, 0 | 0 | 1, 7 | 4 |
| Minimum % T | 100, 100 | 100 | 92, 86 | 89 |
| Time to Reach % T (minutes) | 20, 20 | 20 | 20, 20 | 20 |
| Dm (corrected) | 0, 0 | 0 | 5, 9 | 7 |

TABLE 6

TEST RESULTS
Specific Optical Density - Ex. 7b

| | Smoldering | | Flaming | |
|---|---|---|---|---|
| Properties | Individual Values | Average Value | Individual Values | Average Value |
| Ds @ 1.5 minutes | 0, 0 | 0 | 0, 0 | 0 |
| Ds @ 4.0 minutes | 0, 0 | 0 | 1, 2 | 2 |
| Minimum % T | 100, 100 | 100 | 80, 82 | 81 |
| Time to Reach % T (minutes) | 20, 20 | 20 | 20, 20 | 20 |
| Dm (corrected) | 0, 0 | 0 | 12, 10 | 11 |

Description of Symbols
NBS SMOKE DENSITY; ASTM E662

| | |
|---|---|
| % T | Percent light transmission ranging from 100% to 0% transmittance. |
| Ds | Specific Optical Density- % of light blocked |
| Ds @ 1.5, 4.0 minutes | Values given for aerospace agencies requiring these time criterias in judging the smoke development characteristics of a material. |
| Dm | Maximum % of light blocked |

While exemplary embodiments of the invention have been described, the true scope of the invention is to be determined from the following claims:

What is claimed:

1. A fire resistant article of manufacture comprising a body having one or more fire resistant elements, said elements formed totally or in part of a fire resistant composition having Limiting Oxygen Index (LOI) of equal to or greater than about 41.5, the composition comprising a phenolic triazine resin derived from a cyanato group containing resin of the formula:

or a mixture of such resins,
wherein:
n is a positive whole number greater than or equal to 1;
q and r are the same or different at each occurrence and are whole numbers from 0 to 3, with the proviso that the sum of q and r at each occurrence is equal to 3;
Z is —CN, or hydrogen and —CN;
o and p are the same or different at each occurrence and are whole numbers from 0 to 4, with the proviso that the sum of o and p at each occurrence is equal to 4;
—X— is a divalent organic radical; and
$R_3$ is the same or different at each occurrence and is a substituent other than hydrogen which is unreactive under conditions necessary to completely cure the polymer.

2. The article of claim 1 wherein the gel time of the cyanto group containing phenolic resin is greater than 1 minute.

3. The article of claim 2 wherein the gel time of the cyanto group containing phenolic resin is greater than 10 minutes.

4. The article of claim 1 wherein the phenolic triazine resin has a thermal stability of at least 400° C. as measured by thermal gravimetric analysis.

5. The article of claim 1 wherein phenolic triazine resin has a char yield of at least 50% by weight at 800° C.

6. The article as recited in claim 1 wherein the cynato group containing resin has a number average molecular weight of from 300 to 2000.

7. The article of claim 1 wherein the composition further comprises a fiber dispersed therein.

8. The article of claim 1 wherein the article has a self-extinguishing time of less than 5 seconds.

9. The article of claim 1 wherein the article has substantially no dripping upon burning.

10. The article of claim 7 wherein said dispersed fibers are short fibers.

11. The article of claim 10 wherein said char yield is from about 60 to about 70% by weight.

12. The article of claim 1 wherein said phenolic cyanate resin contains less than about 2% by weight of cyanamide.

13. The article of claim 12 wherein said phenolic cyanate resin contains less than about 1% by weight of cyanamide.

14. The article of claim 13 wherein said phenolic cyanate resin contains no or substantially no cyanamide.

15. The article of claim 1 wherein said phenolic cyanate resin contains less than about 2% by weight of phenyl cyanate.

16. The article of claim 15 wherein said phenolic cyanate resin contains less than about 1% by weight of phenyl cyanate.

17. The article of claim 16 wherein said phenolic cyanate resin contains less than about 0.5% by weight of phenyl cyanate.

18. The article of claim 1 wherein said phenolic cyanate resin is prepared by:
reacting a novolac resin and a trialkylamine to form the trialkylammonium salt of said novolac; and
reacting the trialkylammonium salt of said novalac with a cyanogen halide to form said phenolic cyanate resin containing less than about 2% by weight of dialkyl cyanamide.

19. The article of claim 1 wherein said LOI is equal to or greater than about 45.

20. The article of claim 19 wherein said LOI is from about 45 to about 50.

21. The article of claim 7 wherein said dispersed fibers are long fibers.

22. The article of claim 1 wherein said LOI is greater than about 41.5 to about 45.5.

23. The article of claim 1 wherein said LOI is about 45.

24. The article of claim 4 wherein said resin is self-extinguishing within a time period of less than about 5 seconds measured in accordance with FAR 25 part 25, Appendix F, Vertical Test Method (60 seconds) on a 6 inc.×6 in. plaque of said resin.

25. The article of claim 24 wherein said time period is equal to or less than about 4 seconds.

26. The article of claim 24 wherein said resin has a burn length equal to or less than about 3.1 inches according to said 60 sec and vertical test method.

27. The article of claim 26 wherein said burn length is equal or less than about 2.4 inches.

28. The article of claim 26 wherein said resin under the smoke density test of ASTM E 662 exhibits under smoldering conditions an average Ds @1.5 minutes value of about 0, an average Ds @4.0 minutes of about 0, an average minimum %T value equal to or greater than about 100 wherein time to reach %T is about 20 minutes, and an average Dm. (corrected) value of about 0; and wherein under flamming conditions, said resin exhibits an average Ds @1.5 minutes value of about 0, an average Ds @ value 14.0 minutes equal to or greater than about 4, an average minimum %T value equal to or greater than about 81 wherein time to reach %T is about 20 minutes valve and an average Dm (corrected) value equal to or less about 11.

29. The article of claim 28 wherein said average minimum %T under flamming conditions is equal to or greater than about 89.

30. The article of claim 29 wherein said average Ds at 4.0 minutes is equal to or less than about 4.

31. The article of claim 30 wherein said average Dm (corrected) is equal to or less than about 7.

32. The article of claim 31 wherein —X— is the same or different at each occurrence and is substituted or unsubstituted methylene wherein permissible substituents are alkyl groups having from 1 to about 10 carbon atoms, benzene, halo or furfuryl, phenyldialkylene; or —X— is a moiety of the formula:

33. A resin according to claim 32 wherein —X— is unsubstituted methylene or methylene substituted with one or more alkyl having 1 to about 10 carbon atoms, benzene, halo and furyl, or is a moiety of the formula:

34. The article of claim 33 where —X— is unsubstituted methylene or methylene substituted with alkyl, benzene or furyl.

35. The article of claim 34 wherein —X— is methylene.

36. The article of claim 35 wherein o and q are the same or different at each occurrence and are 0, 1 or 2, p is 2, 3 or 4, r is 1, 2 or 3 and R₃ is alkyl.

37. The article of claim 36 wherein n is from 1 to about 10.

38. The article of claim 37 wherein n is from 1 to about 8.

39. The article of claim 38 wherein n is from 1 to about 5.

40. The article of claim 37 wherein:
o and q are the same or different and are 0 or 1;
r is 2 or 3;
R₃ is methyl; and
ps is 3 or 4, wherein n is selected such that said resin has a number average molecular weight of from about 300 to about 2000.

41. The article of claim 40 wherein:
o and q are 0;
r is 3; and
p is 4.

42. The article of claim 41 wherein said number average molecular weight is from about 320 to about 1500.

43. The article of claim 42 wherein said number average molecular weight is from about 500 to about 1500.

44. The article of claim 42 wherein said body comprises laminate comprising at least one layer of said phenolic triazine resin and at least one layer of another material.

45. The article of claim 42 wherein said material is a polymer, a metal or a combination thereof.

46. The article of claim 42 wherein said phenolic triazine layer further comprises a fiber filler.

47. The article of claim 46 wherein said fibers are short fibers.

48. The article of claim 46 wherein said fibers are long fibers.

49. The article of claim 45 wherein said body comprises at least one polymer layer, metal layer or a combination thereof laminated to at least one surface of said phenolic triazine layer.

* * * * *